United States Patent [19]
Gutowski

[11] Patent Number: 4,757,480
[45] Date of Patent: Jul. 12, 1988

[54] METHOD AND APPARATUS FOR FILTERING SEISMIC DATA

[75] Inventor: Paul R. Gutowski, Tulsa, Okla.

[73] Assignee: Amoco Corporation, Chicago, Ill.

[21] Appl. No.: 855,864

[22] Filed: Apr. 24, 1986

[51] Int. Cl.$^4$ .............................................. G01J 1/36
[52] U.S. Cl. ........................................ 367/47; 367/44; 367/63
[58] Field of Search ................... 367/37, 38, 44–46, 367/59, 63

[56] References Cited

U.S. PATENT DOCUMENTS

| | | | |
|---|---|---|---|
| 2,473,469 | 6/1949 | Dahm | 367/44 X |
| 3,284,769 | 11/1966 | Skelton | 367/63 X |
| 3,327,805 | 6/1967 | Glazier et al. | 367/44 |
| 4,312,050 | 1/1982 | Lucas | 367/44 |
| 4,458,341 | 7/1984 | Goebel | 367/43 |

OTHER PUBLICATIONS

J. E. White, "Motion Product Seismograms," Geophysics, V. XXIX, No. 2, Apr. 1964, pp. 288–298.
E. A. Flinn, "Signal Analysis Using Rectilinearity and Direction of Particle Motion," Dec. 1985, Proc IEEE, pp. 1874–1876.
C. W. Frasier and R. G. North, 1977, "Polarization Filtering of Long-Period SRO Data: Seismic Discriminations," Semiannual Tech Summary, Lincoln Labs.
John I. Bobbitt, "Three-Component Rayleigh Wave Filter," 1984 SEG Annual Meeting.

Primary Examiner—Thomas H. Tarcza
Assistant Examiner—Tod R. Swann
Attorney, Agent, or Firm—Timothy D. Stanley

[57] ABSTRACT

A method and apparatus for filtering seismic data are provided. More particularly, the method and apparatus of the present invention attenuate surface wave generated noise in seismic-trace signals. Seismic data comprising multicomponent seismic-trace signals acquired with single station, multicomponent geophone arrays are comb filtered to produce a plurality of comb filtered signals for each component of the multicomponent seismic-trace signal. The comb filtered signals are sorted into orthogonal sets and a measure of rectilinearity for each orthogonal set is obtained. Surface wave generated noise can then be attenuated in each orthogonal set with its respective measure of rectilinearity.

35 Claims, 4 Drawing Sheets

COMPRESSIONAL WAVES
D - DILATATIONAL MOTION
C - COMPRESSIONAL MOTION

SHEAR WAVES

RAYLEIGH WAVES

METHOD AND APPARATUS FOR FILTERING SEISMIC DATA

BACKGROUND OF THE INVENTION

A method and apparatus for filtering seismic data are provided. More particularly, a method and apparatus are provided for attenuating surface wave generated noise in seismic-trace signals.

Among the more troublesome forms of noise or unwanted signal in seismic data are surface wave generated noise. Since surface waves travel on the earth's surface, they are not attenuated as strongly as body waves which propagate through the earth's subterranean formations. Hence, surface wave generated noise tends to dominate body wave generated signals in the seismic data. Unlike other forms of noise or unwanted signal, surface waves produce coherent noise which cannot be eliminated by conventional common depth point stacking techniques.

Surface waves, including Rayleigh Waves and ground roll, do have certain identifying characteristics which others have employed individually to attenuate surface wave generated noise. Key among these characteristics are their low apparent velocity. By impressing a velocity filter on seismic-trace signals, unwanted surface wave generated noise can generally be removed since surface wave velocities can generally be distinguished from body wave velocities. Further, in large seismic recording arrays, recording array geometry can be adjusted, based on such velocity differences, such that surface wave generated noise will be recorded out of phase at certain locations in the recording array. Subsequent summation of the recorded surface wave generated noise will combine out as a result of being out of phase and hence can be attenuated.

A second characteristic of surface wave generated noise is that its predominate energy is generally contained in frequencies less than 10 Hz. Consequently, a straight forward band limiting frequency filter can attenuate much of the unwanted surface wave generated noise. Although both velocity filtering and band limiting filtering are generally successful, there are areas in which they do not work. In formations characterized by a high apparent velocity, for example, limestones, surface waves apparent velocities can be coincident with normal body wave apparent velocities. Additionally, such surface wave generated noise can contain a significant portion of its energy in frequencies above 10 Hz. As such, velocity filtering and frequency band filtering are not always effective.

A third characteristic of surface wave generated noise is its elliptical retrograde particle motion. To exploit this characteristic, three component seismic data have been acquired with unitary signal station, three component geophone arrays. Each unitary signal station, multicomponent geophone typically comprises one geophone which responds to vertical motion and two geophones, orthogonally spaced one from the other, which respond to horizontal motion. The geophones of such multicomponent geophone are typically arranged in XYZ orthogonal axes.

The elliptical retrograde particle motion of surface wave generated noise evidences itself in that seismic-trace signals acquired by a horizontal geophone of the multicomponent geophone array lead seismic-trace signals acquired by a vertical geophone of the multicomponent geophone array. Consequently, a cross correlation of the horizontal and vertical components of the seismic-trace signals can produce a peak at which surface wave generated noise events occur. However, this approach assumes pure surface wave generated noise events with no other concurrent event. As those skilled in the art would expect, this approach can give ambiguous results when other concurrent events are also present. Moreover, this approach merely provides a method for detecting surface wave generated noise, not a method to remove it.

Another technique which takes advantage of the elliptical retrograde particle motion obtains a measure of rectilinearity of particle motion within a given time window of the multicomponent seismic-trace signals. The degree of rectilinearity of particle motion is measured by a ratio of principal axes of an ellipsoid fit to the three components of the seismic data. Using this technique, compressional and shear body waves form very elongated ellipses—almost a straight line. Hence, a gain factor employing the measure of rectilinearly can be used to enhance linear motions and suppress elliptical motions. Variations of such techniques have been employed with limited success because this technique requires true amplitude relation among the three component seismic-trace signals. Moreover, this technique requires rectilinearity, a condition which is rarely met. For example, a transverse horizontal geophone of the single station, multicomponent geophone array responds to both transverse horizontal motion and radial horizontal motion. More recently, a surface wave generated noise filter has been developed employing a predictive deconvolution technique and the elliptical retrograde particle motion of surface wave generated noise.

Applicant has developed a novel method and apparatus for attenuating surface wave generated noise in seismic data which overcome certain limitations of existing surface wave generated noise filtering techniques.

SUMMARY OF THE INVENTION

The present invention relates generally to a method and apparatus for filtering seismic data. More particularly, a method and apparatus are provided for attenuating surface wave generated noise in seismic-trace signals.

Seismic data, comprising multicomponent seismic trace signals, are acquired with single station, multicomponent geophone arrays. Each geophone of such multicomponent geophone arrays develops a component seismic-trace signal in response to seismic energy imparted into the earth. The multicomponent seismic-trace signals are comb filtered to produce component sets of filtered signals. Unlike prior surface wave noise attenuating techniques which merely employ a band limiting filter, e.g., excluding all frequencies less than 10 Hz, the comb filters of the present invention pass substantially the complete frequency content of each component seismic-trace signal. The comb filters achieve this result by passing a plurality of comb filtered signals each having discrete frequency passbands for each component seismic-trace signal, e.g., 0-10 Hz, 10-20 Hz, etc. Consequently, subsequent elliptical noise attenuation methods operate on discrete frequency passbands of each component seismic-trace signal and thus overcome many of the limitations of existing techniques.

Each component set of filtered signals includes a plurality of comb filtered signals for each component of the multicomponent seismic-trace signals. Each comb filtered signal of a component set of filtered signals has a discrete frequency passband. The component sets of comb filtered signals are sorted into orthogonal sets of comb filtered signals according to passband. A measure of rectilinearity of each orthogonal set of comb filtered signals is obtained. Surface wave generated noise in each orthogonal set of comb filtered signals is then attenuated with its respective measure of rectilinearity to produce orthogonal sets of noise attenuated signals. The orthogonal sets of noise attenuated signals are sorted into component sets and the noise attenuated signals for each respective component set of the multicomponent seismic-trace signal are summed so as to reconstitute the frequency content of each component seismic-trace signal.

The apparatus of the present invention comprises a set of comb filters each having N filter elements with N discrete frequency passbands. Each comb filter is adapted to receive component seismic-trace signals from a geophone of a single station, multicomponent geophone array and produce a component set of N comb filtered signals each having a discrete frequency passband. A set of N parallel polarization filters are interconnected with the comb filters such that each polarization filter is adapted to receive an orthogonal set of comb filtered signals according to passband. A measure of rectilinearity of each orthogonal set of comb filtered signals is obtained by each polarization filter. A set of N parallel multipliers are provided to attenuate surface wave generated noise in each orthogonal set of the comb filtered signals with the respective measure of rectilinearity and to produce noise attenuated signals. A set of parallel summers are interconnected with the N polarization filters such that each summer is adapted to receive a component set of noise attenuated signals. The summers reconstitute the frequency content of each component seismic-trace signals by summing the N noise attenuated signals for each component set.

A BRIEF DESCRIPTION OF THE DRAWINGS

FIGS. 1A, B and C are representations of wave motion properties to illustrate compressional wave, shear wave and Rayleigh waves respectively;

DESCRIPTION OF THE PREFERRED EMBODIMENT

The present invention is generally directed to a method and apparatus for filtering seismic data. More particularly, a method and apparatus are provided for attenuating surface wave generated noise in seismic-trace signals.

Seismic data generally comprises seismic-trace signals developed by geophones, at spaced locations on the earth's surface, in response to seismic energy imparted into the earth. The seismic-trace signals include body wave generated events representative of reflections, refractions and transmission of the seismic energy in the earth's subterranean formations. Such events are generally referred to as the "signal" of the seismic-trace signals. Mixed in with the signal of the seismic-trace signal are surface wave generated events and other undesirable events which are generally referred to as the "noise" of the seismic-trace signal. Such surface wave generated noise is particularly troublesome because it is not as strongly attenuated by the earth as body wave generated signal. Consequently, surface wave generated noise tends to dominate the signal of the seismic-trace signal. Thus, filtering seismic-trace signals to accentuate the signal and to attenuate the noise is highly desirable.

Figure 1A:
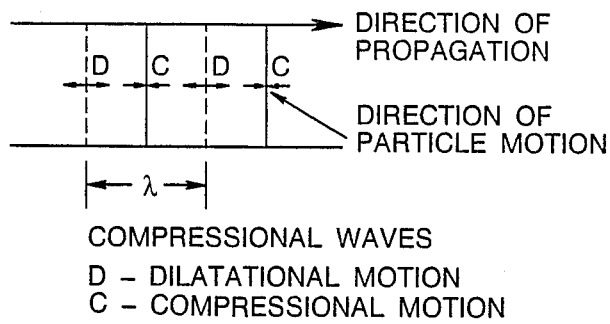
Figure 1B:
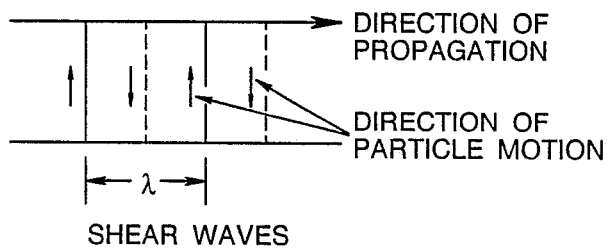
Figure 1C:
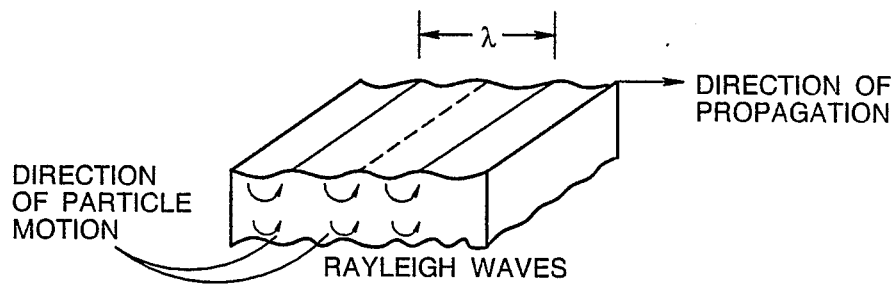

Surface wave generated noise has certain identifying characteristics which can be employed to distinguish it from reflected and refracted body wave generated signal. Generally, surface wave generated noise has a lower predominate frequency and a narrower band width. Additionally, surface wave generated noise is elliptically polarized rather than linearly polarized. FIGS. 1A, B and C, respectively, depict wave motion characteristics and wave length $\lambda$ for compressional and shear body waves as well as for Rayleigh waves. In areas where multicomponent seismic data (e.g., two or three component seismic data) are acquired, it is often necessary to reduce surface wave generated noise so as to enhance reflection and refraction signals. This is especially important when single station, multicomponent seismic data are acquired in which geophone arrays are not laid out to attenuate surface wave generated noise. Thus, a method and apparatus have been developed to attenuate surface wave generated noise in multicomponent seismic data acquired with single station, multicomponent geophone arrays.

Figure 2:
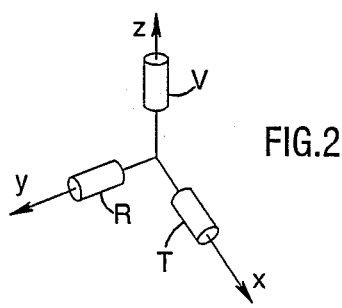
FIG. 2 is a schematic representation of a single station, multicomponent geophone array.

Multicomponent seismic data can be acquired with a single station, multicomponent geophone array M as shown schematically in FIG. 2. The single station, multicomponent geophone array M includes separate geophones R (radial), T (transverse) and V (vertical) each adapted to respond primarily to motion along a given axis with respect to a line of survey. As depicted in FIG. 2 the axes of geophones R, T and V are linearly independent and in a preferred embodiment form Cartesian or orthogonal XYZ axes. Those skilled in the art will appreciate that the present invention is not limited to multicomponent seismic data acquired with single station, multicomponent geophone arrays having orthogonal axes, but can employ other single station, multicomponent geophone arrays such as Gal'prin. It is further understood that such single station, multicomponent geophone arrays M need only have at least two geophones having linearly independent axes (for example R and V or T and V) to practice the present invention. Those skilled in the art will further recognize that multicomponent seismic data can be recorded with both unitary single station, multicomponent geophone arrays, such as the Gal'prin and Cartesian multicomponent geophones, as well as with arrays of single component geophones which comprise at least two separate arrays of single component geophones each having linearly independent axes located substantially at each recording station. Unitary single station, multicomponent geophone arrays are preferred since they expedite the recording of multicomponent seismic data. However, both unitary single station, multicomponent geophone arrays and single station arrays of single component geophones having at least two linearly independent axes are comprehended within the term "single station, multicomponent geophone arrays."

METHOD

Figure 3:
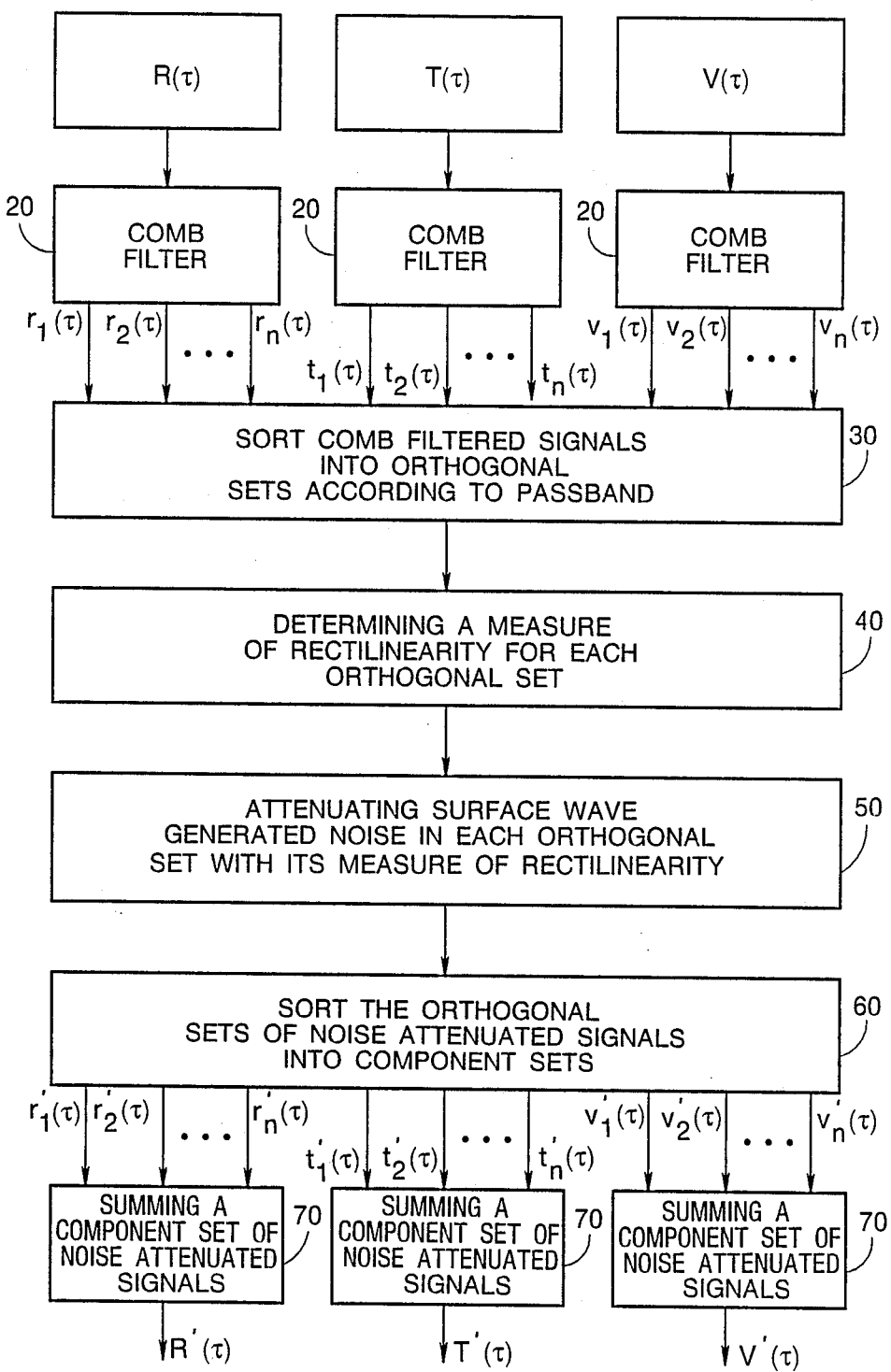
FIG. 3 is a flow diagram of the method of the present invention.

Looking next to FIG. 3, a flow process diagram of the present invention is shown. A set of multicomponent seismic data is collected comprising seismic-trace signals developed by single station, multicomponent geophone arrays M having three geophones with orthogonal axes (e.g., R, T, and V). Seismic-trace signals of each geophone $R(\tau)$, $T(\tau)$, and $V(\tau)$ are each passed through separate component comb filters 20. Each component comb filter 20 comprises a set of N parallel frequency bandpass filters which produce a component set of N comb filtered signals each having a discrete frequency band. In a preferred embodiment, the passbands can be adjacent and can increase linearly or by octaves. The low and high cut frequencies of each passband are specified such that a summation of the N comb filtered signals for each component $[r_n(\tau)$, $t_n(\tau)$ and $v_n(\tau)]$ would replicate the original input seismic trace signal; e.g., $$R(\tau) \simeq \sum_{n=1}^{N} r_n(\tau) \quad (1)$$

The N comb filtered signals for each component set are sorted at 30 into orthogonal sets according to passband, e.g., $[r_n(\tau)$, $t_n(\tau)$ and $v_n(\tau)]$. The orthogonal sets of comb filtered signals are processed by a polarization filter 40 to obtain a measure of rectilinearity for each orthogonal set. The polarization filter 40 employs principal axis analysis where eigenvalues $\lambda_i$ and their associated eigenvectors $d_i$ can be calculated.

Polarization filtering in the time domain can be based upon a least squares fit of sample points within a sample window of the comb filtered signals to an ellipsoid calculated from the multicomponent seismic data. A direction and squared length of each axis of the ellipsoid are given by the eigenvector $d_i$ and the corresponding eigen-value $\lambda_i$ of a covariance matrix $C=(C_{ij})$ and can be obtained according to:

$$C_{ij} = \frac{1}{m-1} \left[ \sum_{\tau=1}^{m} x_i(\tau)x_j(\tau) - \frac{1}{m} \left[ \sum_{\tau=1}^{m} x_i(\tau) \right] \left[ \sum_{\tau=1}^{m} x_j(\tau) \right] \right] \quad (2)$$

where m is the number of sample points in sample window $\tau$ and $x_1(\tau)$, $x_2(\tau)$ and $x_3(\tau)$ are respectively the component seismic-trace signals $r_n(\tau)$, $t_n(\tau)$, and $v_n(\tau)$ and where i and j can take on values of 1 and 2 for two component seismic data or 1, 2 and 3 for three-component seismic data.

As the sample window $\tau$ slides in time through the seismic data, the direction and magnitude of the largest axis constantly change. The degree of rectilinearity of particle motion within the specified sample window can be measured by a ratio of principal axes of the covariance matrix. In particular, a measure of rectilinearity $G=1-\lambda_2/\lambda_1$ where $\lambda_1$ is the magnitude of the largest eigenvalue and $\lambda_2$ is the magnitude of the next largest eigenvalue, can be employed.

Those skilled in the art recognize that many such principal axis analysis techniques are available and that the preceding analytical description is merely by way of example. What is significant in the technique set forth in Eq. (2) is that the eigenvalues $\lambda_i$ and the eigen-vectors $d_i$ are obtained from auto and cross product sums two or three component seismic data within a sliding sample window of a time length $\tau$. The sample window length $\tau$ can depend upon the frequency passband as will be described below.

For a given sample window position or time along the comb filtered two- or three-component seismic signals, the following values are computed:

windowed vertical values are multiplied by themselves and these values are summed given a value for vertical product sum $V(\tau)*V(\tau)$;

the same procedure is applied to the radial and if available, the transverse components giving corresponding values $R(\tau)*R(\tau)$ and $T(\tau)*T(\tau)$;

for the same windowed position, the vertical and radial values are multiplied together and then summed giving a value for the cross product sum $V(\tau)*R(\tau)$. When the transverse component is available the same procedure results in the values $V(\tau)*T(\tau)$ and $R(\tau)*T(\tau)$.

These values can then be arrayed in a matrix:

$$\begin{bmatrix} R(\tau)*R(\tau) & R(\tau)*T(\tau) & R(\tau)*V(\tau) \\ T(\tau)*R(\tau) & T(\tau)*T(\tau) & T(\tau)*V(\tau) \\ V(\tau)*R(\tau) & V(\tau)*T(\tau) & V(\tau)*V(\tau) \end{bmatrix}$$

The matrix has nine values for three component seismic data and four values if only two component seismic data are employed. A new rotated two or three component coordinate system V', R' and T' can be developed so that after rotating the old coordinate system V, R, T of the seismic data onto it, all the new cross product sums $(V(\tau)'*R(\tau)'$, $V(\tau)'*T(\tau)'$, $R(\tau)'*T(\tau)')$ are close to zero. The new auto product sums $(V(\tau)'*V(\tau)'$, $R(\tau)'*R(\tau)'$, and $T(\tau)'*T(\tau)')$ are referred to as the eigenvalues $\lambda_i$. The angles necessary to accomplish this rotation are contained in the two or three eigenvectors $d_i$. The eigenvalues $\lambda_i$ and eigenvectors $d_i$ form the basis for the next step on the sets of comb filtered seismic signals.

In most cases, surface wave generated noise is strongly apparent in a plane defined by two of the three components usually $V(\tau)$ and $R(\tau)$, i.e., it is elliptically polarized. If part of the surface wave generated noise lies within a particular sample window position along two of the comb filtered signals, then two of the eigenvalues $\lambda_i$ will be of comparable magnitude. The ratio of the intermediate eigenvalue $\lambda_2$ to the larger eigenvalue $\lambda_1$ will be close to unity. If on the other hand a linearly polarized reflection occurs within a sample window the two largest eigenvalues will differ greatly and the ratio of the intermediate to the largest will be close to zero. Therefore, for each sample window $\tau$, a rectilinearity function $G(\tau)$ can be generated which is a function of the intermediate eigenvalue $\lambda_2$ to the largest eigenvalue $\lambda_1$ according to:

$$G(\tau) = 1 - \lambda_2/\lambda_1. \quad (3)$$

The sample window slides down the orthogonal set of comb filter signals one sample, and a new measure of rectilinearity $G(\tau)$ is computed and so on until the whole orthogonal set of comb filtered signals have been scanned and a rectilinearity function $G(\tau)$ has been generated. In addition, for each sample window position, the entries of the eigenvectors $d_i$ associated with the largest eigenvalue (two or three entries for two or three components) are stored, e.g., the eigenvectors $d_1(\tau)$, $d_2(\tau)$, and $d_3(\tau)$. Now the comb filtered seismic signals of each orthogonal set are multiplied time point for time point at 50 by their respective rectilinearity function $G(\tau)$ which has the effect of attenuating elliptical particle motion and enhancing linear particle motion. This effect can be increased by multiplying again by the rectilinearity function $G(\tau)$, either once or several times at 50. Further each component of an orthogonal set of comb filtered signals can in turn by multiplied by its eigenvector $d_i$ so as to further enhance linear motion along a rotated axis. That is, each component signal of an orthogonal set of comb filtered signals undergoes a point gain according to:

$$v_n'(\tau) = v_n(\tau) \times G_n(\tau) \times d_1(\tau)$$
$$r_n'(\tau) = r_n(\tau) \times G_n(\tau) \times d_2(\tau) \qquad (4)$$
$$t_n'(\tau) = t_n(\tau) \times G_n(\tau) \times d_3(\tau)$$

for a three component system. Here $v_n'(\tau)$, $r_n'(\tau)$, and $t_n'(\tau)$ each represent a noise attenuated signal for a discrete frequency passband.

The length of the sliding sample window $\tau$ can depend upon the frequency passband of each comb filter according to a prescribed rule. One scheme found useful is to make the sample window length $\tau$ vary according to the reciprocal of the center frequency of each passband used in component comb filter 20. The lower frequency passbands will use longer sample windows and the higher frequency passbands will use shorter sample windows.

Each component signal of an orthogonal set of comb filtered signals can be further modulated at 50 with a scalar, such as the product sums $V'(\tau)^*$, $V'(\tau)$, $R'(\tau)^*$, $R'(\tau)$ and $T'(\tau)^*$, $T'(\tau)$ or their square roots respectively, determined over another sample window $\tau'$ of substantially constant length and much longer than the sample window $\tau$ employed for the rectilinearity function. This step is to make sure that each frequency passband of the comb filter contributes approximately equally. The noise attenuated signals of the orthogonal sets of comb filtered signals are sorted at 60 into component sets, e.g., $r_1'(\tau)$, $r_2'(\tau) \ldots r_n'(\tau)$. Next, the N noise attenuated signals for each component set are separately summed at 70 so as to substantially reconstitute the frequency content thereof; e.g., $$R'(\tau) = \sum_{n=1}^{N} r_n'(\tau). \qquad (5)$$

The summing process produces two or three component signals in which the surface wave generated noise is attenuated and the signal reflection/refractions are enhanced.

APPARATUS

Figure 4:
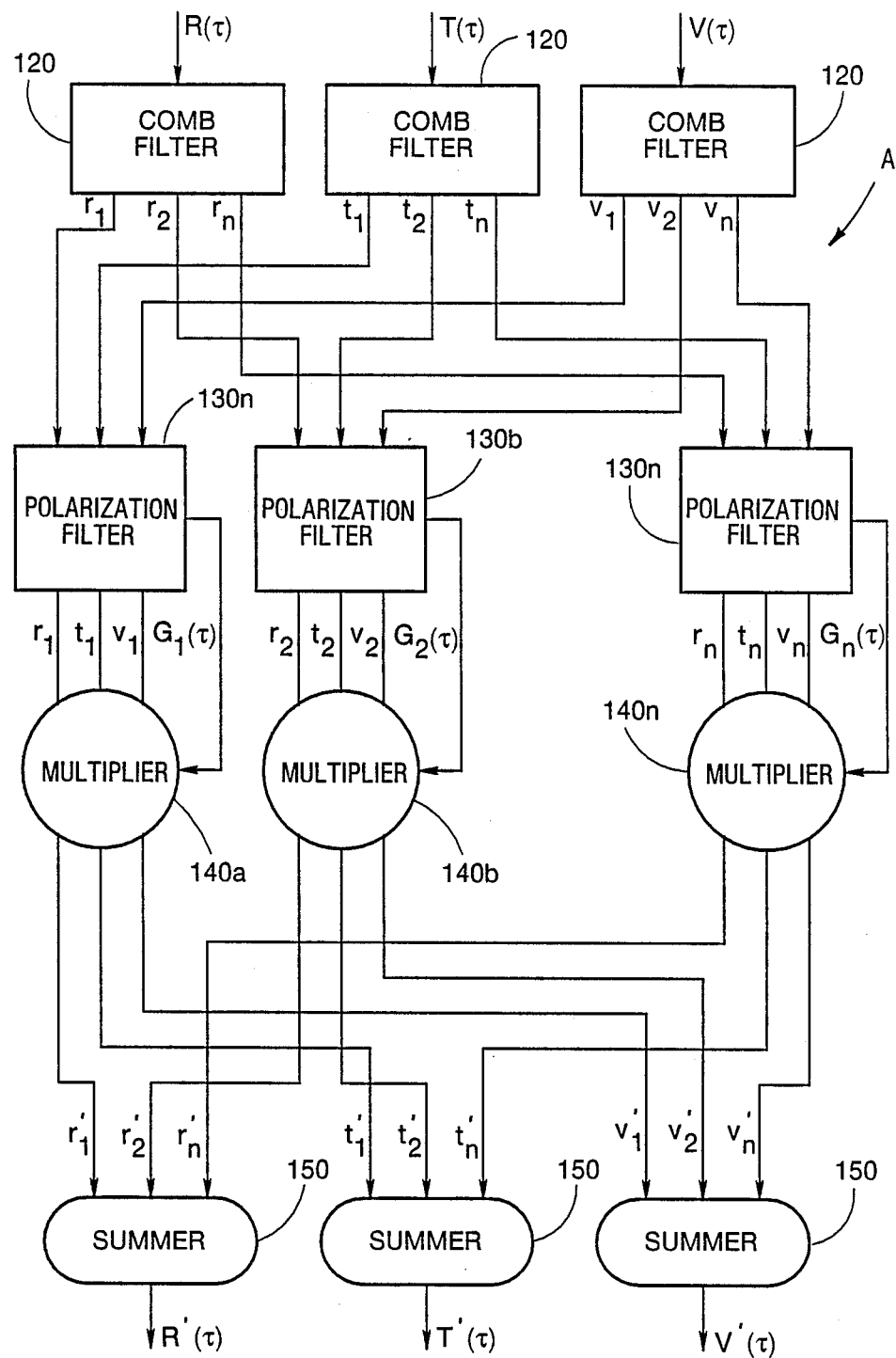
FIG. 4 is a schematic representation of the apparatus of the present invention.

A preferred embodiment of an apparatus A to attenuate surface wave generated noise is schematically depicted in FIG. 4. Those skilled in the art will appreciate that the apparatus A can include digital processing circuits, as well as analog processing circuits.

More specifically, the apparatus A comprises a set of parallel component comb filters 120, each having N passband filter elements with N discrete frequency passbands. Separate component comb filters 120 are provided for each component seismic-trace signal of a set of multi-component seismic-trace signals. The N frequency passbands can be incremented in equal bands (e.g., 0–10 Hz, 10–20 Hz, 20–30 Hz, etc.) or in octaves (e.g., 0–10 Hz, 10–30 Hz, 30–70 Hz, etc.). Irrespective of the actual passbands selected, the low and high cut frequencies of each passband filter are specified such that a summation of the output N comb filtered signals substantially replicate the frequency content of the original component seismic-trace signal:

$$r_1 + r_2 + \ldots + r_n \approx R(\tau).$$

The apparatus A further includes N parallel polarization filters 130a, 130b . . . 130n interconnected to each component comb filter 120 such that each polarization filter 130a, 130b . . . 130n is adapted to receive an orthogonal set of comb filtered signals, i.e., $[r_n, t_n \text{ and } v_n]$, according to passband. Each polarization filter 130a, 130b . . . 130n employs a principal axis analysis technique where eigenvalues $\lambda_i$ and their associated eigenvectors $d_i$ can be obtained. Exemplary of such technique is Eq. (2). The polarization filters 130a, 130b . . . 130n are further adapted to obtain a measure of rectilinearity $G_n$ for each orthogonal set of comb filtered signals from the eigenvalues $\lambda_i$, e.g., as set forth in Equation (3). Additionally, a set of N parallel multipliers 140a, 140b . . . 140n are each serially interconnected to the N polarization filters 130a, 130b . . . 130n and are provided to modulate each orthogonal set of comb filtered signals with its respective measure of rectilinearity. Each multiplier 140a, 140b . . . 140n is further adapted to modulate each comb filtered signal of the orthogonal set with its corresponding eigenvector $d_i$. Thus, each multiplier 140a, 140b . . . 140n produces an orthogonal set of noise attenuated signals, e.g., $[r_n', t_n' \text{ and } v_n']$ as set forth in Eq. (4).

The apparatus A also includes a set of parallel summers 150 each interconnected to the multipliers 140a, 140b . . . 140n such that each summer 150 is adapted to receive a component set of noise attenuated signals, i.e., $[r_1', r_2' \ldots r_n']$, such that the frequency content of each component seismic trace signal is reconstituted by the summers 150 summing the N noise attenuated signals for each component seismic trace signal.

EXAMPLES

Figure 5A:
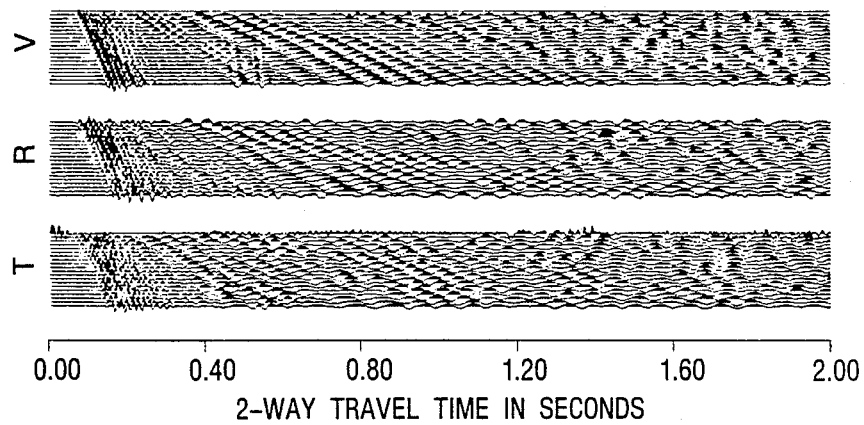
FIG. 5A is input seismic-trace signals from a multicomponent geophone array having geophone axes T, R, V.
Figure 5B:
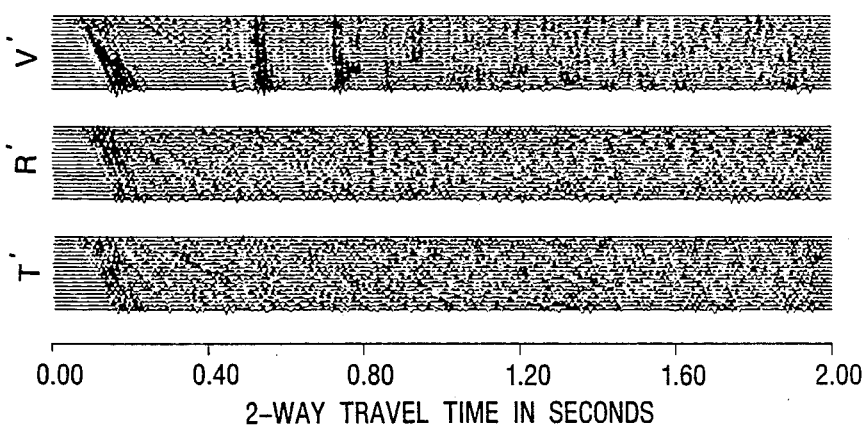
FIG. 5B is surface wave noise attenuated seismic-trace signals from FIG. 5A in accordance with the present invention.

Attention is now directed to FIG. 5A, which comprises a set of multicomponent seismic-trace signals, e.g., T, R, V, without processing to enhance signal and attenuate surface wave generated noise. Here the seismic trace signals are dominated by surface wave generated noise which is characterized by its large amplitudes and low frequencies. FIG. 5B comprises a set of multicomponent, seismic-trace signals, e.g., T', R', V', which represent the application of the present invention to the set of multicomponent seismic data of FIG. 5A. Signal events are now clearly discernible especially in seismic-trace signals R' and V' of FIG. 5B, which were not discernible in FIG. 5A, even to the trained eye of a geophysicist.

Applicant has thus provided a unique method for enhancing signal and attenuating surface wave generated noise in multicomponent seismic data. The advantages of this invention will now be apparent to those skilled in the art. It will also be apparent that a number of variations and modifications may be made in this invention without departing from its spirit and scope. Accordingly, the foregoing description is to be construed as illustrative and the scope of the invention is set forth in the claims below.

What is claimed is:

1. A method for attenuating surface wave generated noise in seismic data, wherein the seismic data comprises multicomponent seismic-trace signals acquired by single station, multicomponent geophone arrays in response to seismic energy imparted into the earth, comprising the steps of:
   (a) comb filtering the seismic-trace signals of each geophone of the multicomponent geophone array to produce component sets of filtered signals, wherein each component filtered signal includes a plurality of comb filtered signals each having a discrete frequency passband;
   (b) sorting the component sets of comb filtered signals into orthogonal sets according to passband;
   (c) determining a measure of rectilinearity for each orthogonal set of comb filtered signals; and
   (d) attenuating surface wave generated noise in each orthogonal set of comb filtered signals with its respective measure of rectilinearity.

2. The method of claim 1 further including the steps of:
   (a) sorting the orthogonal sets of noise attenuated comb filtered signals into component sets of noise attenuated comb filtered signals; and
   (b) summing each component set of noise attenuated comb filtered signals.

3. The method of claim 2 further including the step of displaying the reconstituted signals as seismic sections.

4. The method of claim 1, wherein the seismic-trace signals are comb filtered with a plurality of parallel passband filters having adjacent frequency passbands.

5. The method of claim 4, wherein the frequency passbands are equal.

6. The method of claim 4, wherein the frequency passbands increase in octaves.

7. The method of claim 1, wherein each single station, multicomponent geophone has at least two orthogonal geophones to form sets of orthogonal seismic-trace signals.

8. The method of claim 1, wherein step (c) comprises:
   (a) determining eigenvectors $d_i$ and corresponding eigenvalues $\lambda_i$ of covariance matrix $C_{ij}$ for a sliding sample window $\tau$ of each orthogonal set of comb filtered signals according to:

$$C_{ij} = \frac{1}{m-1} \left[ \sum_{\tau=1}^{m} x_i(\tau) x_j(\tau) - \frac{1}{m} \left[ \sum_{\tau=1}^{m} x_i(\tau) \right] \left[ \sum_{\tau=1}^{m} x_j(\tau) \right] \right]$$

where
m = number of sample points in sample time window $\tau$
i,j can take on values 1, 2, 3
$x_1$ = seismic trace signals of a first geophone
$x_2$ = seismic trace signals of a second geophone
$x_3$ = seismic trace signals of a third geophone
$\tau$ = sample window length and (b) determining a ratio of the next largest eigenvalue $\lambda_2$ to the largest eigenvalue $\lambda_1$ to provide the measure of rectilinearity according to $G\tau = 1 - \lambda_2/\lambda_1$.

9. The method of claim 8 wherein step (d) comprises multiplying each signal of the orthogonal set of comb filtered signals with its respective measure of rectilinearity $G(\tau)$ at least once.

10. The method of claim 8 further including the step of multiplying each signal of the orthogonal set of comb filtered signals with its corresponding eigenvector $d_i$.

11. The method of claim 8 wherein the sample window length $\tau$ varies inversely with the central frequency of each passband.

12. An apparatus for attenuating surface wave generated noise in seismic data wherein the seismic data comprise multicomponent seismic-trace signals developed by single station, multicomponent geophone arrays in response to seismic energy imparted into the earth comprising:
   (a) comb filter means for comb filtering each component seismic-trace signal of the multicomponent seismic data so that a plurality of comb filtered signals, each having a discrete frequency passband, is obtained for each component seismic trace signal;
   (b) polarization means interconnected with the comb filter means for obtaining a measure of rectolinearity for orthogonal sets of comb filtered signals having selected frequency passband; and
   (c) multiplier means interconnected with polarization means for attenuating surface wave generated noise in each orthogonal set of comb filtered signals with its respective measure of rectilinearity.

13. The apparatus of claim 12 further including summing means interconnected with the polarizations for reconstituting frequency content of each component seismic trace signal by summing the N noise attenuated signals of each component.

14. The apparatus of claim 12 wherein each polarization means is adapted to determine eigenvectors $d_i$ for a sliding sample window of each orthogonal set of comb filtered signals and the multiplier is further adapted to modulate the gain of the signals of each orthogonal set of comb filtered signals with its respective eigenvector $d_i$.

15. A method for filtering seismic data comprising multicomponent seismic-trace signals, including the steps of:
   (a) comb filtering the multicomponent seismic-trace signals to form comb filtered signals;
   (b) attenuating elliptically polarized noise in the comb filtered signals to form noise attenuated signals; and
   (c) summing the noise attenuated signals.

16. The method of claim 15 wherein step (a) includes comb filtering each component seismic-trace signal of the multicomponent seismic-trace signals to produce component sets of filtered signals wherein each component filtered signal includes a plurality of comb filtered signals each having a discrete frequency passband.

17. The method of claim 16 further including the step of sorting the component sets of comb filtered signals into orthogonal sets according to frequency passband.

18. The method of claim 17 wherein step (b) comprises determining a measure of rectilinearity for each orthogonal set of comb filtered signals and attenuating elliptically polarized noise in each orthogonal set of comb filtered signals with its respective measure of rectilinearity.

19. The method of claim 18 further including the step of sorting the orthogonal sets of noise attenuated signals into component sets of noise attenuated signals.

20. The method of claim 19 wherein step (c) comprises summing the component sets of noise attenuated signals.

21. A method for attenuating surface wave generated noise in seismic data, wherein the seismic data comprises multicomponent seismic trace signals acquired by single station, multicomponent geophone arrays in response to seismic energy imparted into the earth, comprising the steps of:
  (a) dividing the frequency content of the seismic trace signals of each geophone of the multicomponent geophone array into a plurality of discrete frequency passbands;
  (b) sorting the discrete frequency passbands of the seismic trace signals into orthogonal sets of signals according to passband;
  (c) determining a measure of rectilinearity of each orthogonal set of signals; and
  (d) attenuating surface wave generated noise in each orthogonal set of signals with its respective measure of rectilinearity.

22. The method of claim 21 further including the steps of:
  (a) sorting the orthogonal sets of noise attenuated signals into component sets of noise attenuated signals; and
  (b) summing each component set of noise attenuated signals to substantially reconstitute the frequency content of the original signals.

23. The method of claim 22 further including the step of displaying the reconstituted signals as seismic sections.

24. The method of claim 21 wherein the seismic trace signals are divided into a plurality of discrete frequency passbands having adjacent frequency passbands.

25. The method of claim 24 wherein the frequency passbands are equal.

26. The method of claim 24 wherein the frequency passbands increase in octaves.

27. The method of claim 21 wherein each single station component geophone has at least two orthogonal geophones to form sets for orthogonal seismic trace signals.

28. The method of claim 21, wherein step (c) comprises:
  (a) determining eigenvectors $d_i$ and corresponding eigenvalues $\lambda_i$ of covariance matrix $C_{ij}$ for a sliding sample window $\tau$ of each orthogonal set of signals according to:

$$C_{ij} = \frac{1}{m-1} \sum_{\tau=1}^{m} x_i(\tau) x_j(\tau) - \frac{1}{m}\left[\sum_{\tau=1}^{m} x_i(\tau)\right]\left[\sum_{\tau=1}^{m} x_j(\tau)\right]$$

where
  m = number of sample points in sample time window $\tau$
  i,j can take on values 1, 2, 3
  $x^1$ = seismic trace signals of a first geophone
  $x_2$ = seismic trace signals of a second geophone
  $x_3$ = seismic trace signals of a third geophone
  $\tau$ = sample window length and
  (b) determining a ratio of the next largest eigenvalue $\lambda_2$ to the largest eigenvalue $\lambda_1$ to provide the measure of rectilinearity according to $G(\tau) = 1 - \lambda_2/\lambda_1$.

29. The method of claim 8 wherein step (d) comprises multiplying each signal of the orthogonal set of signals with its respective measure of rectilinearity $G(\tau)$ at least once.

30. The method of claim 8 further including the step of multiplying each signal of the orthogonal set of signals with its corresponding eigenvector $d_i$.

31. The method of claim 8 wherein the sample window length $\tau$ varies inversely with the central frequency of each passband.

32. An apparatus for attenuating surface wave generated noise in seismic data wherein the seismic data comprise multicomponent seismic-trace signals developed by single station, multicomponent geophone arrays in response to seismic energy imparted into the earth comprising:
  (a) filter means for dividing the frequency content of each component seismic-trace signal of the multicomponent seismic into a plurality of filtered signals, each having a discrete frequency passband;
  (b) means interconnected with the filter means for obtaining a measure of rectilinearity for orthogonal sets of filtered signals having selected frequency passband; and
  (c) multiplier means interconnected with polarization means for attenuating surface wave generated noise in each orthogonal set of filtered signals with its respective measure of rectilinearity.

33. The apparatus of claim 32 further including summing means interconnected with the polarizations for reconstituting frequency content of each component seismic trace signal by summing the N noise attenuated signals of each component.

34. The apparatus of claim 32 wherein each polarization means is adapted to determine eigenvectors $d_i$ for a sliding sample window of each orthogonal set of comb filtered signals and the multiplier is further adapted to modulate the gain of the signals of each orthogonal set of comb filtered signals with its respective eigenvector $d_i$.

35. A method for attenuating surface wave generated noise in seismic data, wherein the seismic data comprises multicomponent seismic trace signals acquired by single station, multicomponent geophone arrays in response to seismic energy imparted into the earth, comprising the steps of:
  (a) comb filtering the seismic trace signals acquired by single station, multicomponent geophone arrays into a plurality of discrete frequency passband encompassing substantially the complete frequency spectrum of the seismic trace signals; and
  (b) polarization filtering each of the discrete frequency passbands of the seismic trace signals to attenuate surface wave generated noise.

* * * * *

UNITED STATES PATENT OFFICE
CERTIFICATE OF CORRECTION

PATENT NO. : 4,757,480
DATED : July 12, 1988
INVENTOR(S) : Paul R. Gutowski

It is certified that error appears in the above-identified patent and that said Letters Patent are hereby corrected as shown below:

Column 10, line 3, "G$\tau$" should read --G($\tau$)--.

Signed and Sealed this

Twenty-fifth Day of April, 1989

Attest:

DONALD J. QUIGG

Attesting Officer

Commissioner of Patents and Trademarks